United States Patent
Boes et al.

(10) Patent No.: US 6,390,486 B1
(45) Date of Patent: May 21, 2002

(54) WHEEL SUSPENSION FOR MOTOR VEHICLES WITH A WHEEL-GUIDING LEAF SPRING

(75) Inventors: Joachim Boes, Saarbruecken; Michael Schmidt, Marpingen; Wolfram Seibert, Ober-Ramstadt, all of (DE); Pim van der Jagt, Sittard; Roger Graaf, Gulpen, both of (NL)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/653,648

(22) Filed: Sep. 1, 2000

(30) Foreign Application Priority Data

Sep. 3, 1999 (EP) .............................. 99117368

(51) Int. Cl.[7] .................................. B60G 3/10
(52) U.S. Cl. .................... 280/124.171; 280/124.175; 280/124.128; 267/192
(58) Field of Search .................. 280/124.171, 124.175, 280/124.128; 267/7, 183, 189, 192, 36.1, 47

(56) References Cited

U.S. PATENT DOCUMENTS

| | | | | |
|---|---|---|---|---|
| 2,695,791 A | * | 11/1954 | Heftler | 280/124.128 |
| 2,697,613 A | * | 12/1954 | Giacosa | 280/124.128 |
| 3,197,190 A | * | 7/1965 | Miyashiro | 267/192 |
| 4,458,918 A | * | 7/1984 | Rumpel | 280/124.143 |
| 4,557,500 A | * | 12/1985 | Collard et al. | 280/669 |
| 4,725,074 A | * | 2/1988 | Stevens | 280/124.143 |
| 5,016,861 A | * | 5/1991 | Thompson | 267/44 |
| 5,141,209 A | * | 8/1992 | Sano et al. | 267/36.1 |
| 5,251,930 A | * | 10/1993 | Kusaka et al. | 280/124.14 |
| 5,826,896 A | * | 10/1998 | Baumann | 280/124.14 |

* cited by examiner

Primary Examiner—Brian L. Johnson
Assistant Examiner—Deanna Draper
(74) Attorney, Agent, or Firm—Gregory P. Brown

(57) ABSTRACT

In order to limit rolling movements of the vehicle, spring arms are formed on those ends of the leaf spring, arranged transversely to the vehicle, on which the wheel carriers are articulated, said spring arms being connected in a force-transmitting manner to the transverse leaf spring. The spring arms point toward the longitudinal mid-plane of the vehicle and run at an acute angle to the transverse leaf spring. Since the spring designed in this way is a universally available structural part (the spring arms running at an angle may also be produced separately and then be connected non-positively to the transverse leaf spring), the two wheels are connected to one another directly and the triangular shape formed by the spring arms running at an angle gives rise to a function similar to that of a transverse link.

18 Claims, 5 Drawing Sheets

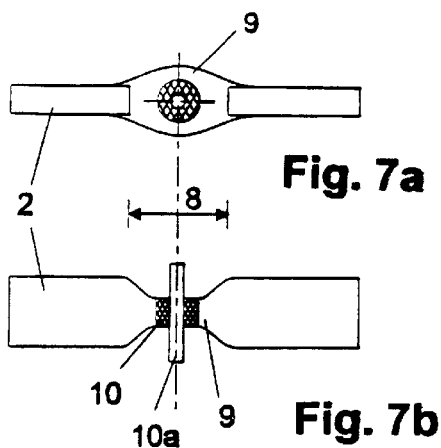
Fig. 7a
Fig. 7b
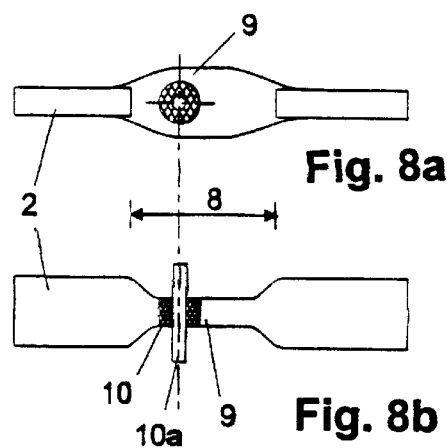
Fig. 8a
Fig. 8b
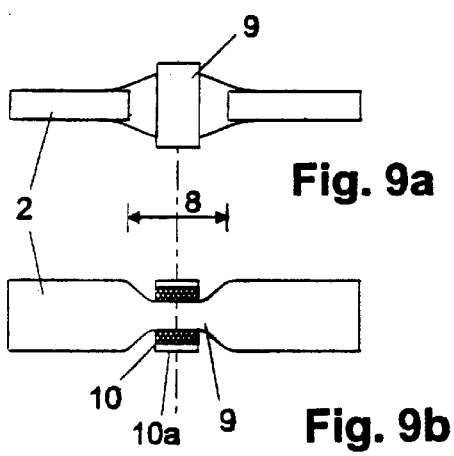
Fig. 9a
Fig. 9b
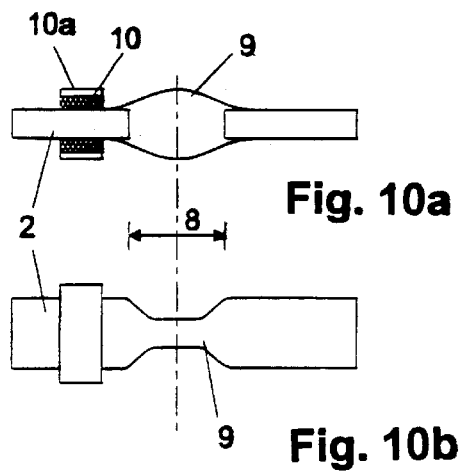
Fig. 10a
Fig. 10b

WHEEL SUSPENSION FOR MOTOR VEHICLES WITH A WHEEL-GUIDING LEAF SPRING

BACKGROUND OF THE INVENTION

The invention relates to a wheel suspension for motor vehicles.

DESCRIPTION OF THE PRIOR ART

DE 195 33 803 discloses suspension of this type with a leaf spring arranged transversely to the vehicle. The leaf spring is mounted on the vehicle body and is articulated on the wheel carrier. Support on the vehicle body is provided by means of special elastic elements on both sides with respect to the longitudinal mid-plane of the vehicle.

The transversely arranged leaf spring has belonged to the prior art for a long time. For example, DE 61 26 40 describes a stack of springs of graded length. For a spring stack of this kind, DE 93 73 91 shows semicylindrical clamping elements arranged on both sides of the longitudinal mid-plane and oriented transversely to the longitudinal direction of the leaf spring.

DE 195 42 108 provides, for the longitudinal and transverse support of the wheel-guiding transverse leaf spring, two flexurally resistant supporting struts which are symmetrically arranged axially off-center and which are oriented at least essentially in the longitudinal direction of the vehicle and are in each case connected at one end to the transverse leaf spring in a dimensionally and angularly fixed manner by means of a clamping connection. The free ends of the supporting struts are articulated on the vehicle body via bearings containing rubber bodies and allowing a cardanic or spherical movement. The supports are intended to achieve the necessary roll-moment support in addition to the longitudinal transverse support, because the leaf spring region located between the supports is to be considered as a torsion spring acting counter to the rolling direction. Support relative to the vehicle body is obtained, here, via a level-regulating actuator arranged in the longitudinal mid-plane of the vehicle and via the bearings of the supporting struts arranged in the longitudinal direction.

The requirement demanded of a vehicle axle as regards driving stability and agility necessitates high transverse rigidity, whereas a high degree of longitudinal flexibility is necessary for good rolling comfort. Hitherto known concepts with wheel-guiding leaf springs do not satisfy this requirement. The object of the invention was to bring about the vertical and rolling suspension of a vehicle by means of a wheel-guiding leaf spring, with requirements as regards stability and comfort being taken into account at the same time.

SUMMARY OF THE INVENTION

To achieve this object, in the wheel suspension for motor vehicles with a wheel-guiding leaf spring which is arranged transversely to the vehicle, is mounted on both sides of a longitudinal mid-plane of the vehicle with respect to the motor vehicle body and is articulated on the wheel carrier (transverse leaf spring), spring arms are formed on those ends of the transverse leaf spring on which the wheel carriers are articulated, said spring arms being connected in a force-transmitting manner to the transverse leaf spring, in particular being an integral component of the transverse leaf spring. The spring arms are likewise supported relative to the motor vehicle body. Since the spring designed in this way is a universally available structural part (the spring arms can also be produced separately and then be connected positively to the transverse leaf spring), the two wheels are connected to one another directly and a function similar to that of a transverse link is achieved by means of the spring arms connected in a force-transmitting manner, in conjunction with the supports relative to the motor vehicle body. Considerably improved roll compensation is obtained by means of this combination.

The spring arms are preferably formed symmetrically with respect to the longitudinal mid-plane of the vehicle.

The spring arms point toward the longitudinal mid-plane of the vehicle and run preferably at an acute angle to the longitudinal direction of the transverse leaf spring. The spring arms and/or the end portions of the transverse leaf spring may have a curved shape. In this case, the alignments between the supports relative to the motor vehicle body and the connection point of the transverse leaf spring and spring arm are to form a triangle with an acute angle at the connection point.

It is preferred, furthermore, that the distance between the supports arranged at the end of the spring arms corresponds approximately to the distance between the supports of the transverse leaf spring.

The triangular shape formed by the support of the spring arm ends and of the transverse leaf spring on the vehicle body and by the connection at the point of articulation for the wheel carrier results directly, as an integral part of the spring, in a transverse link function by means of which longitudinal and transverse forces can be absorbed.

Different cross-sectional shapes in the longitudinal and transverse directions may be considered for the transverse leaf spring and the spring arms. By means of the different cross-sectional shapes and the local variation in the cross sections of the transverse leaf spring and of the spring arms, the individual functions of vertical suspension, roll compensation and longitudinal flexibility of the axle can be optimized separately from one another. In particular, optimization may be achieved by coordination of the radii of curvature in the vertical and/or horizontal plane and by the arrangement of the supports relative to the vehicle body. Rubber bearings relative to the vehicle body, which are arranged at the ends of the spring arms, may advantageously be used for progressive longitudinal rigidity and for damping.

In order to reduce the longitudinal rigidity of the transverse leaf spring, these may have, in particular, portions of reduced width or contractions, with the result that the longitudinal forces are absorbed to an increased extent by the spring arms.

Preferably, in the region of reduced width of the transverse leaf spring (contraction), there is arranged a web which runs perpendicularly to the surface of the transverse leaf spring and in the longitudinal direction of the latter, is oriented approximately vertically in the direction of installation and leads to increased torsional rigidity. The web itself may advantageously receive the support of the transverse leaf spring relative to the vehicle body. Roll compensation can be influenced by the design of the connection points on the vehicle body. An articulated connection allows high roll compensation; fixed clamping reduces this roll compensation.

To achieve the desired elastokinematic properties, such as, for example, roll center height, changes in toe and in camber due to compression or rolling of the vehicle and to longitudinal and lateral forces, the transverse leaf springs and the spring arms may be curved, in which case, in particular, the spring arm ends may have different radii of curvature than the transverse leaf spring. The end portions of the spring arms in the installation position may be arranged higher or lower than the transverse leaf spring. For reasons of space (for example, the height required for the transmission), in particular, the transverse leaf spring may be designed in the form of a rocker in the transverse plane of the vehicle.

The transverse leaf spring described may be produced from fiber-reinforced plastic in order to reduce the masses to be suspended, thus resulting, in particular, in a marked reduction of high-frequency vibrations. In this version, complicated rubber bearing elements for support on the vehicle body may also be dispensed with.

The transverse leaf spring according to the invention, with spring arms, may be used for the lower or the upper wheel articulation, in conjunction with a damper or with a further transverse link, but also for both wheel articulations.

Using the transverse leaf spring according to the invention, the rolling movement can be reduced to an extent such that a separate stabilizer is no longer necessary.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 7a is an end view of a second embodiment of a contraction region according to the present invention.

FIG. 7b is a top plan view of a second embodiment of a contraction region according to the present invention.

FIG. 8a is an end view of a third embodiment of a contraction region according to the present invention.

FIG. 8b is an top plan view of a third embodiment of a contraction region according to the present invention.

FIG. 9a is an end view of a fourth embodiment of a contraction region according to the present invention.

FIG. 9b is a top plan view of a fourth embodiment of a contraction region according to the present invention.

FIG. 10a is an end view of a second embodiment of a contraction region according to the present invention.

FIG. 10b is a top plan view of a second embodiment of a contraction region according to the present invention.

DESCRIPTION OF THE DRAWINGS

Figure 1:
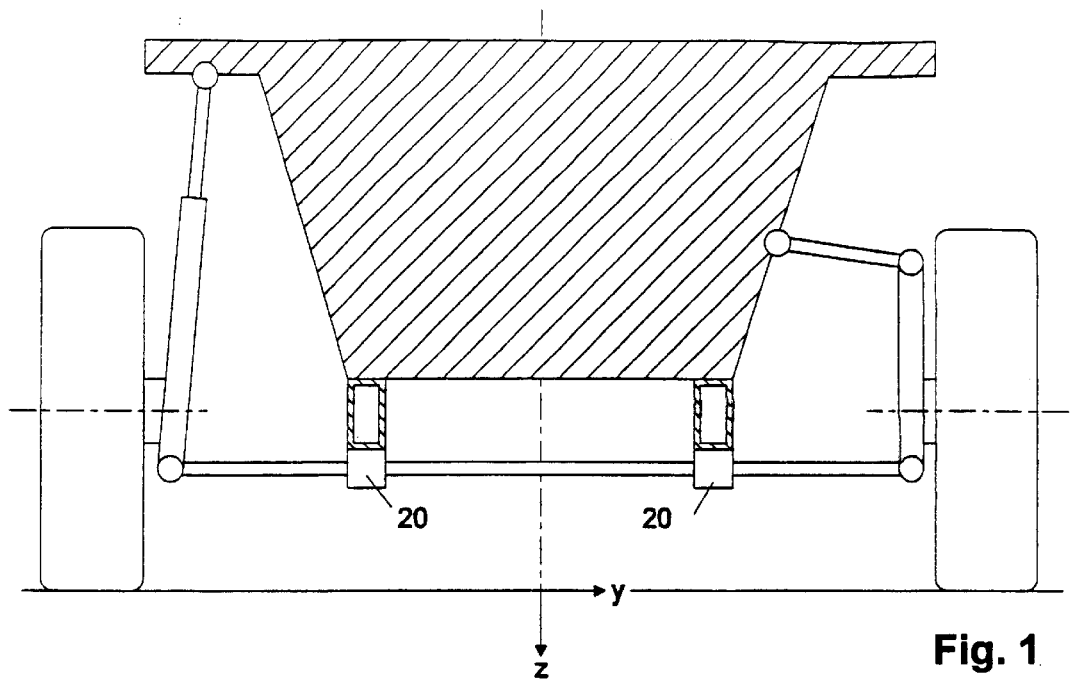
FIG. 1 is an end view of a first embodiment of a suspension according to the present invention.

FIGS. 1a and 1b show a respective front end view and plan view of a transverse leaf spring which has a longitudinal direction transverse to the vehicle. The leaf spring has spring arms extending therefrom and a horizontal projection. The transverse leaf spring 2 has spring arms 3, 4 running at an acute angle thereto arranged on the wheel suspension 1. The first ends 3a and 4a of spring arms are directed inward toward longitudinal mid-plane 7 of the vehicle inward from respective second ends 3b, 4b. That is, first ends 3a and 4a are located at a distance Y1 from mid-plane 7 and second ends 3b and 4b are located a distance Y2, where Y1 is less than Y2. The spring arms 3, 4 are illustrated, here, as an integrally formed component of the transverse leaf spring 2. Second ends 3b and 4b of spring arms 3, 4 connect to transverse leaf spring 2. The transverse leaf spring 2 is mounted elastomerically relative to the vehicle body at support 20. First ends 3a, 4a of respective spring arms 3, 4 are mounted elastomerically relative to the vehicle body in supports 21.

The spring arms 3, 4 may be arranged opposite to the forward direction of travel x (as illustrated in FIG. 1) or in the forward direction of travel.

Figure 2:
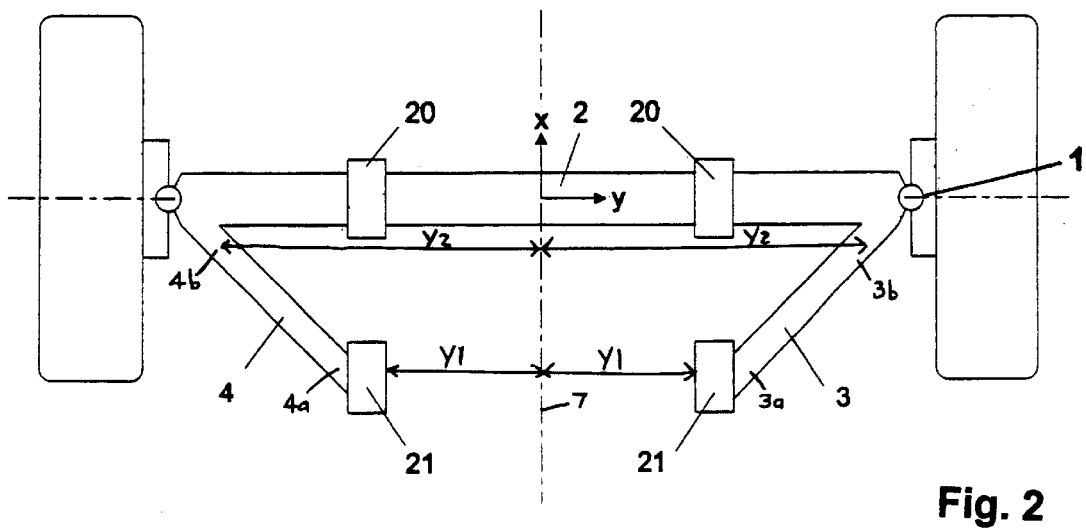
FIG. 2 is a top plan view of a first embodiment of a suspension according to the present invention.
Figure 3:
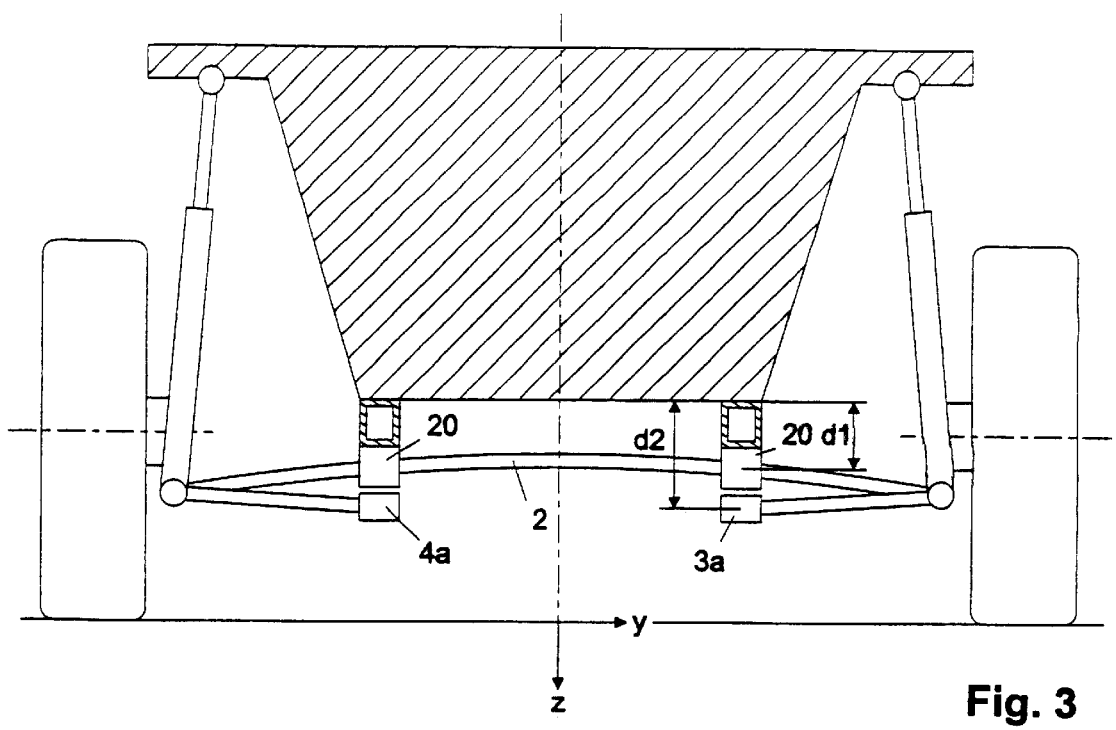
FIG. 3 is an end view of a second embodiment of a suspension according to the present invention.
Figure 4:
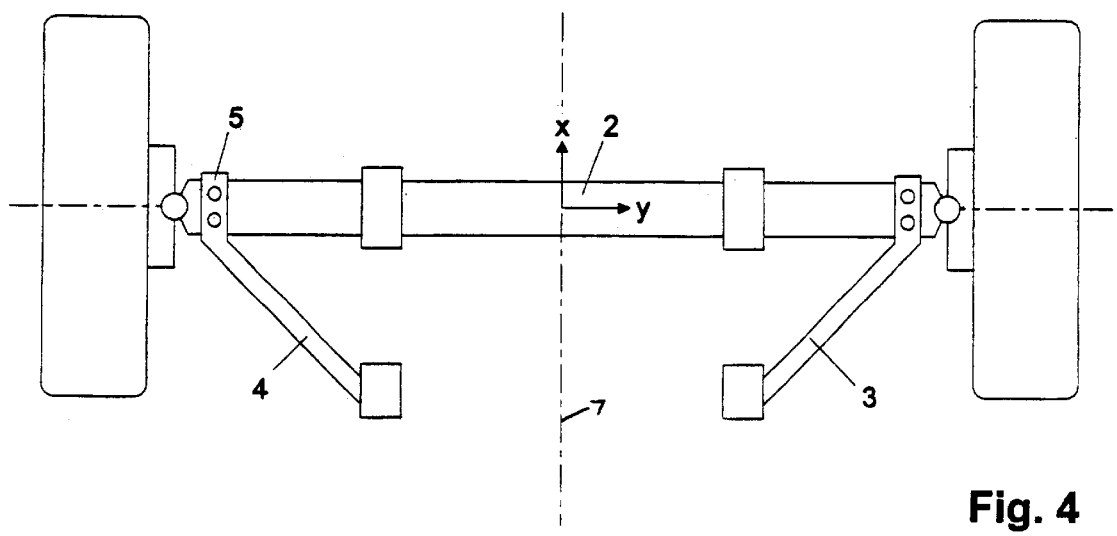
FIG. 4 is a top plan view of a second embodiment of a suspension according to the present invention.

As is clear in FIGS. 3 and 4b, the spring arms 3, 4 may be designed as separate parts and are then connected positively to the transverse leaf spring 2 in the region of the points of articulation 5. In this version, but also in the one-piece version of FIGS. 1 and 2, the spring arms 3, 4 may have a different radius of curvature than the transverse leaf spring 2 with respect to the vertical plane (in the installation position). The ends 3a, 4a of the spring arms 3, 4 may, in particular, (in the installation position) be arranged lower or higher than the transverse leaf spring 2 (the distance d2 of the spring arm ends 3a, 4a from the vehicle body is larger or smaller than the distance d1 of the transverse leaf spring from the vehicle body).

Figure 5A:
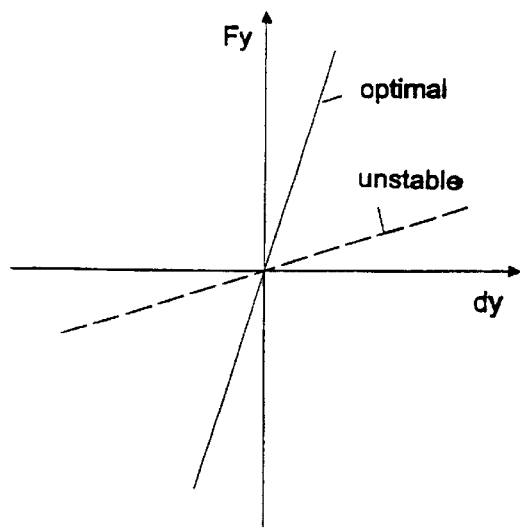
FIG. 5a is a plot of force versus displacement of the axle for the y-direction is illustrated showing optimal and unstable regions.
Figure 5B:
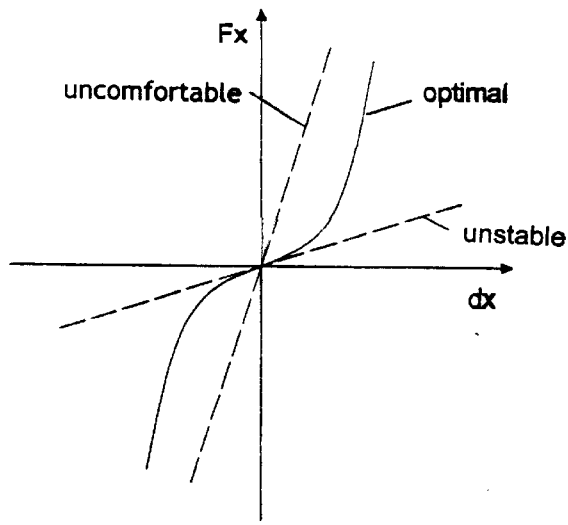
FIG. 5b is a plot of force versus displacement of the axle for the x-direction is illustrated showing uncomfortable, optimal and unstable regions.

As illustrated in FIGS. 5a and 5b (in conjunction with FIG. 6), high transverse rigidity of the axle is necessary for driving stability and agility (Fy runs steeply relative to the displacement in a transverse direction dy). For high stability during braking, sufficient longitudinal rigidity under high longitudinal forces is necessary. Consequently, the progressive profile, illustrated in FIGS. 5a and 5b, of the longitudinal rigidity Fx relative to the displacement in a longitudinal direction dx is to be considered as ideal.

Figure 6:
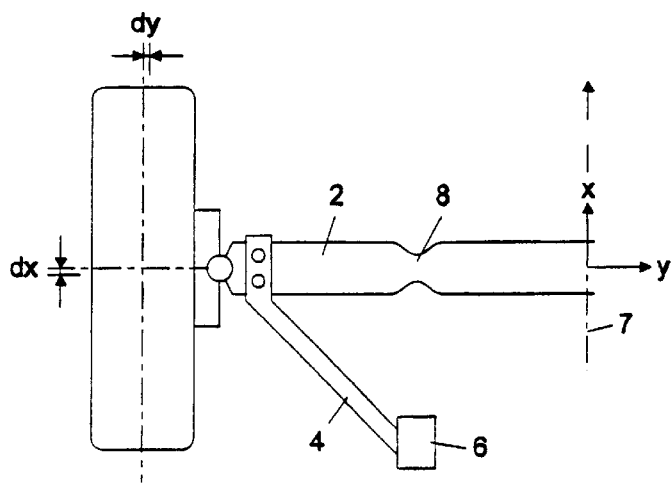
FIG. 6 is a partial plan view of an third embodiment of the invention having a first embodiment of a contraction region according to the present invention.
Figure 11:
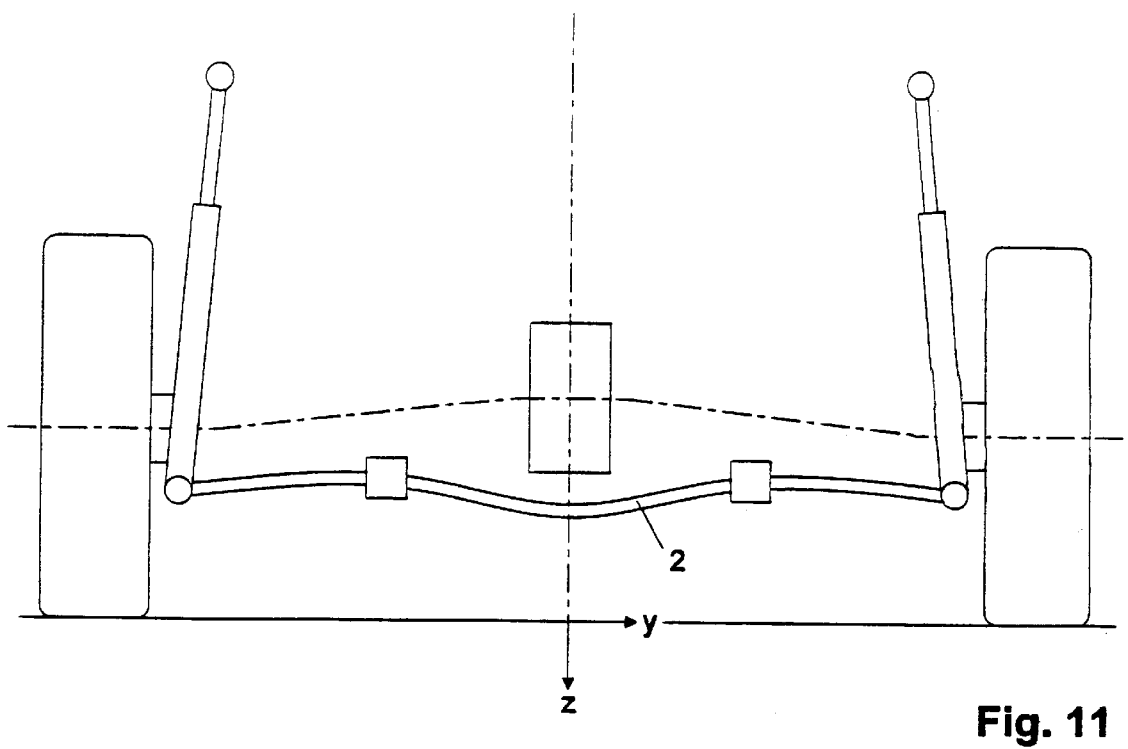
FIG. 11 is an end view of an alternative embodiment of the transverse member of the invention.

As illustrated in FIG. 6, in order to shift the longitudinal forces onto the spring arm 4 the transverse leaf spring 2 may have a contraction or reduced-width portion 8 which is preferably essentially at the same distance from the longitudinal mid-plane 7 of the vehicle as the support 6 of the spring arm by means of which the latter is connected to the vehicle body.

The longitudinal rigidity of the transverse leaf spring 2 is reduced by means of at the contraction 8, with the result that the longitudinal forces are absorbed to an increased extent by the spring arm 4. The progressive rise in longitudinal rigidity and, at the same time, damping are achieved via an elastomeric bearing arranged at the spring arm end and located on the support 6.

As illustrated in FIGS. 7a to 10b, the transverse leaf spring 2, preferably in the region of a contraction (reduced width portion) 8, has a web 9 which runs approximately perpendicularly to the transverse leaf spring and in the longitudinal direction of the latter, the support 10a relative to the vehicle body advantageously being provided, particularly using rubber bearings 10, on this web. The position of support 10a on bearing 10 may be varied depending on the particular configuration and characteristics desired.

More specifically, in FIGS. 7a and 7b the support 10a is located in the center of web 9 which coincides with reduce thickness portion 8. In FIGS. 8a and 8b the support 10a is located off center relative to web 9. In FIGS. 9a and 9b the support 10a is located in the center of web 9 and has a width greater than web 9. In FIGS. 10a and 10b, the support 10a is positioned adjacent to web 9 on a portion of transverse leaf spring 2 that has not been reduced.

In FIG. 6, the transverse leaf spring has a rocker-like contour or curved portion, as seen in the front view (installation position), as a result of which, particularly in the case of a driven axle, the necessary construction space for the transmission or for the axle gear, is taken into account.

While particular embodiments of the invention have been shown and described, numerous variations and alternate embodiments will occur to those skilled in the art. Accordingly, it is intended that the invention be limited only in terms of the appended claims.

What is claimed is:

1. A wheel suspension for a motor vehicle comprising:
   a transverse leaf spring positioned transversely to the vehicle, said leaf spring mounted on both sides of a longitudinal mid-plane of the vehicle with respect to the motor vehicle body and is articulated on a wheel carrier;
   a first spring arm and second spring arm (3, 4) each having a first end coupled to the motor vehicle body and a second end coupled to the transverse leaf spring (2) in a force-transmitting manner;
   wherein the transverse leaf spring has reduced width portions (8) which are arranged approximately at the same distance from the longitudinal mid-plane of the vehicle as the inwardly pointing ends (3a, 4a) of the spring arms (3, 4).

2. The wheel suspension as claimed in claim 1, wherein the spring arms (3, 4) are arranged symmetrically with respect to the longitudinal mid-plane of the vehicle.

3. The wheel suspension as claimed in claim 1, wherein the first spring arm and the second spring arm form an acute angle to a longitudinal direction of the transverse leaf spring so that a first end of the first spring arm and a first end of the second spring arm are directed inward toward the longitudinal mid-plane of the vehicle.

4. The wheel suspension as claimed in claim 1, wherein the distance between the ends (3a, 4a) of the spring arms (3, 4) corresponds approximately to the distance between supports (20) of the transverse leaf spring (2).

5. The wheel suspension as claimed in claim 1, wherein supports (6, 21) of the spring arms on the motor vehicle body are located at the ends (3a, 4a) of the spring arms (3, 4).

6. The wheel suspension as claimed in claim 1, wherein a radius of curvature of the spring arms (3, 4) is smaller or larger than that of a radius of curvature of the transverse leaf spring (2).

7. The wheel suspension as claimed in claim 1, wherein the first end of the first spring arm and the first end of the second spring arm (3, 4) are positioned arranged lower or higher than the transverse leaf spring (2).

8. The wheel suspension as claimed in claim 1, further comprising supports coupling the vehicle body to the spring arms, said supports comprise elastomeric dampers.

9. The wheel suspension as claimed in claim 1, wherein the transverse leaf spring (2) and the first and second spring arms (3, 4) are integrally formed.

10. The wheel suspension as claimed in claim 1, wherein the first and second spring arms (3, 4) are positively coupled to the transverse leaf spring.

11. The wheel suspension as claimed in claim 1, wherein the transverse leaf spring (2) and the first and second spring arms (3, 4) are composed of fiber-reinforced plastic.

12. A wheel suspension for a motor vehicle comprising:
    a transverse leaf spring positioned transversely to the vehicle, said leaf spring mounted on both sides of a longitudinal mid-plane of the vehicle with respect to the motor vehicle body and is articulated on a wheel carrier;
    a first spring arm and second spring arm (3, 4) each having a first end coupled to the motor vehicle body and a second end coupled to the transverse leaf spring (2) in a force-transmitting manner;
    wherein the transverse leaf spring (2) has a pair of reduced width portions (8) positioned symmetrically with respect to the longitudinal mid-plane of the vehicle.

13. The wheel suspension as claimed in claim 12, further comprising a web (9) running approximately perpendicularly to the transverse leaf spring and in the longitudinal direction of the leaf spring positioned in the reduced-width portion.

14. The wheel suspension as claimed in claim 13, wherein a support (10, 10a) is positioned on the web (9), said support positioned substantially vertically relative to the vehicle body.

15. A wheel suspension for a motor vehicle having a longitudinal mid-plane comprising:
    a transverse leaf spring positioned transversely to the vehicle, said leaf spring mounted on both sides of a longitudinal mid-plane of the vehicle with respect to the motor vehicle body;
    a first spring arm and second spring arm located (3, 4) symmetrically with respect to the longitudinal mid-plane of the vehicle, each having a first end coupled to the motor vehicle body and a second end coupled to the transverse leaf spring (2) in a force-transmitting manner, wherein the first spring arm and the second spring arm form an acute angle to a longitudinal direction of the transverse leaf spring so that a first end of the first spring arm and a first end of the second spring arm are positioned a first distance from the longitudinal mid-plane of the vehicle and the second end of the first spring arm and the second end of the second spring arm are located a second distance from the longitudinal mid-plane, said second distance greater than the first distance;
    wherein said transverse leaf spring has a first and second support located on opposite sides of the longitudinal mid-plane the first distance from the longitudinal mid-plane of the vehicle.

16. The wheel suspension as claimed in claim 15, further comprising a web positioned at a constriction of the transverse leaf spring.

17. The wheel suspension as claimed in claim 16, wherein said web is positioned the first distance from the longitudinal mid-plane.

18. The wheel suspension as claimed in claim 17, wherein said first and second supports are coupled to said web.

* * * * *